United States Patent
Yang et al.

(10) Patent No.: US 8,102,133 B2
(45) Date of Patent: Jan. 24, 2012

(54) CONTROL CIRCUIT FOR BLDC MOTORS

(75) Inventors: Ta-Yung Yang, Milpitas, CA (US);
Pei-Sheng Tsu, Taipei County (TW);
Shih-Jen Yang, Taipei County (TW);
Yi-Min Hsu, Taichung (TW);
Chung-Hui Yeh, Taipei County (TW)

(73) Assignee: System General Corporation, Sindian, Taipei County (TW)

( * ) Notice: Subject to any disclaimer, the term of this patent is extended or adjusted under 35 U.S.C. 154(b) by 441 days.

(21) Appl. No.: 12/488,676

(22) Filed: Jun. 22, 2009

(65) Prior Publication Data
US 2010/0007295 A1    Jan. 14, 2010

Related U.S. Application Data

(60) Provisional application No. 61/134,489, filed on Jul. 9, 2008.

(51) Int. Cl.
*H02P 6/00* (2006.01)

(52) U.S. Cl. .......... 318/400.01; 318/400.05; 318/400.03

(58) Field of Classification Search ............. 318/400.01, 318/400.05, 400.03, 400.22, 400.07, 599
See application file for complete search history.

(56) References Cited

U.S. PATENT DOCUMENTS

2008/0219648 A1 *   9/2008   Liu ................................ 388/811
* cited by examiner

*Primary Examiner* — Karen Masih
(74) *Attorney, Agent, or Firm* — Thomas|Kayden

(57) ABSTRACT

A BLDC (brushless direct current) motor system of the present invention includes a control circuit, a sequencer, a driving circuit, and a BLDC motor. The control circuit determines the maximum torque and the maximum speed of the BLDC motor. The control circuit includes an over-current detection circuit to generate a reset signal in response to a switching current of the BLDC motor. The reset signal is generated when the switching current of the BLDC motor exceeds a threshold. A pulse width of the PWM signal is correlated to the level of a speed-control signal and the level of the torque-control signal. The pulse width of the PWM signal is also controlled by the reset signal generated by the over-current detection circuit.

13 Claims, 4 Drawing Sheets

CONTROL CIRCUIT FOR BLDC MOTORS

CROSS REFERENCE TO RELATED APPLICATIONS

The present application claims the benefit of U.S. provisional application entitled "Over-current and Over-torque Protection Circuits for BLDC Motor", Ser. No. 61/134,489, filed Jul. 9, 2008.

BACKGROUND OF THE INVENTION

1. Field of the Invention

The present invention relates generally to a BLDC (brushless direct current) motors, and more particularly, to a control circuit for BLDC motors.

2. Description of the Related Art

BLDC motors are nowadays gaining popularity in automotive, consumer, and industrial applications. They have many advantages over traditional brushed DC motors such as higher efficiency, better speed and torque characteristics, low noise generation, wider speed range, less maintenance and longer operating life.

As shown in FIG. 1, a BLDC motor 30 includes three phase windings A, B, and C. To sequentially control the current flowing through the windings A, B, and C, referred to as a known six-step commutation, the BLDC motor 30 will begin to run as the poles of the permanent magnet rotor change angular position. In each step commutation, only two windings are energized.

A driving circuit 25 is coupled to drive the BLDC motors 30 according to the six-step commutation. The driving circuit 25 comprises a plurality of power transistors. A current flowing through two windings is determined by an on-period of the conducted power transistors of the driving circuit 25. For example, while the windings A and B are energized, the variation of the current flowing through the windings A and B which is denoted as $\Delta I_{AB}$ can be expressed as the following equation:

$$\Delta I_{AB} = \frac{V_{IN} - EMF}{L_{AB}} \times \Delta T_{ON} \quad (1)$$

where $V_{IN}$ is the input voltage; EMF is the back electromotive force of the BLDC motor 30; $\Delta T_{ON}$ is the variation of the on-period of the conducted power transistors; and $L_{AB}$ is the equivalent inductance of the windings A and B.

The torque of the BLDC motor 30 is correlated to the current flowing through the conducted power transistors of the driving circuit 25 and the two windings of the BLDC motor 30. Therefore, limiting the current flowing through the conducted power transistors avoids an over-current condition of the power transistors of the driving circuit 25 and also avoids an over-torque condition of the BLDC motor 30.

The power transistors of the driving circuit 25 need to be protected when an excess mechanical load condition of the BLDC motor 30 occurs. The electromotive force varies in direct proportion to the speed of the BLDC motor 30. As the load of the BLDC motor 30 increases, the electro-motive force of the BLDC motor 30 will be decreased in response to the lowered speed of the BLDC motor 30. As equation (1) shows, the current flowing through the two windings of the BLDC motor 30 and the conducted power transistors of the driving circuit 25 will be increased accordingly, which increases the torque of the BLDC motor 30. The increased current might damage the power transistors of the driving circuit 25 and the windings of the BLDC motor 30. Furthermore, the increased torque might damage the mechanical load or cause hurt to the human body.

Power transistors also need to be protected under faulty conditions of the BLDC motor 30, such as locked motor rotor caused from bearing failure or phase winding damages. As the motor rotor is locked, a speed-feedback loop will dramatically increase the on-period of the conducted power transistors of the driving circuit 25 to correct the speed of the BLDC motor 30. However, the dramatically increased current might cause permanent damages to the conducted power transistors of the driving circuit 25 without protection circuits.

Therefore, there is a need to provide a control circuit to properly limit the current flowing through the conducted power transistors of the driving circuit 25 for preventing the damages to the conducted power transistors and the mechanical load or avoiding the human body being hurt by the excess torque of the BLDC motor 30.

BRIEF SUMMARY OF THE INVENTION

A BLDC (brushless direct current) motor system of the present invention comprises a control circuit, a sequencer, a driving circuit, and a BLDC motor. The control circuit determines the maximum torque and the maximum speed of the BLDC motor. The control circuit comprises a torque-feedback loop, a PWM circuit, an over-current detection circuit, a filter capacitor, and a compensation capacitor. The torque-feedback loop comprises a torque-control circuit, a reference-signal generator and an error amplifier.

The torque-feedback loop receives a plurality of switching-current signals and generates a torque-control signal. The torque-control signal is generated by amplifying an error between a torque-feedback signal and a torque-reference signal. The torque-feedback signal is generated in response to the plurality of switching-current signals which are correlated to a switching current of the BLDC motor. The torque-reference signal is generated in response to data provided by an interface which can be a parallel data bus or a serial data bus. The over-current detection circuit is coupled to generate a reset signal in response to the switching current of the BLDC motor. The reset signal is generated when the switching current of the BLDC motor exceeds a threshold. A pulse width of the PWM signal is determined in response to the torque-control signal and/or the reset signal.

The PWM circuit also generates the PWM signal in response to a speed-control signal. The speed-control signal is sourced from a speed-control circuit in response to a plurality of speed-output signals which are generated by hall sensors embedded to a stator of the BLDC motor. The pulse width of the PWM signal is also correlated to the level of the speed-control signal. The sequencer receives the PWM signal to modulate the pulse width of a plurality of switching signals output by the sequencer. The switching signals are further coupled to drive the BLDC motor via the driving circuit. According to the arrangement of six-step commutation, the BLDC motor can therefore run smoothly.

It is an objective of the present invention to provide an over-current detection circuit to protect power transistors of the driving circuit and windings of the BLDC motor.

It is also another objective of the present invention to provide an over-torque control circuit to protect the mechanical load of the BLDC motor or the human body.

It is also another objective of the present invention to provide an interface to program the maximum torque of the BLDC motor.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
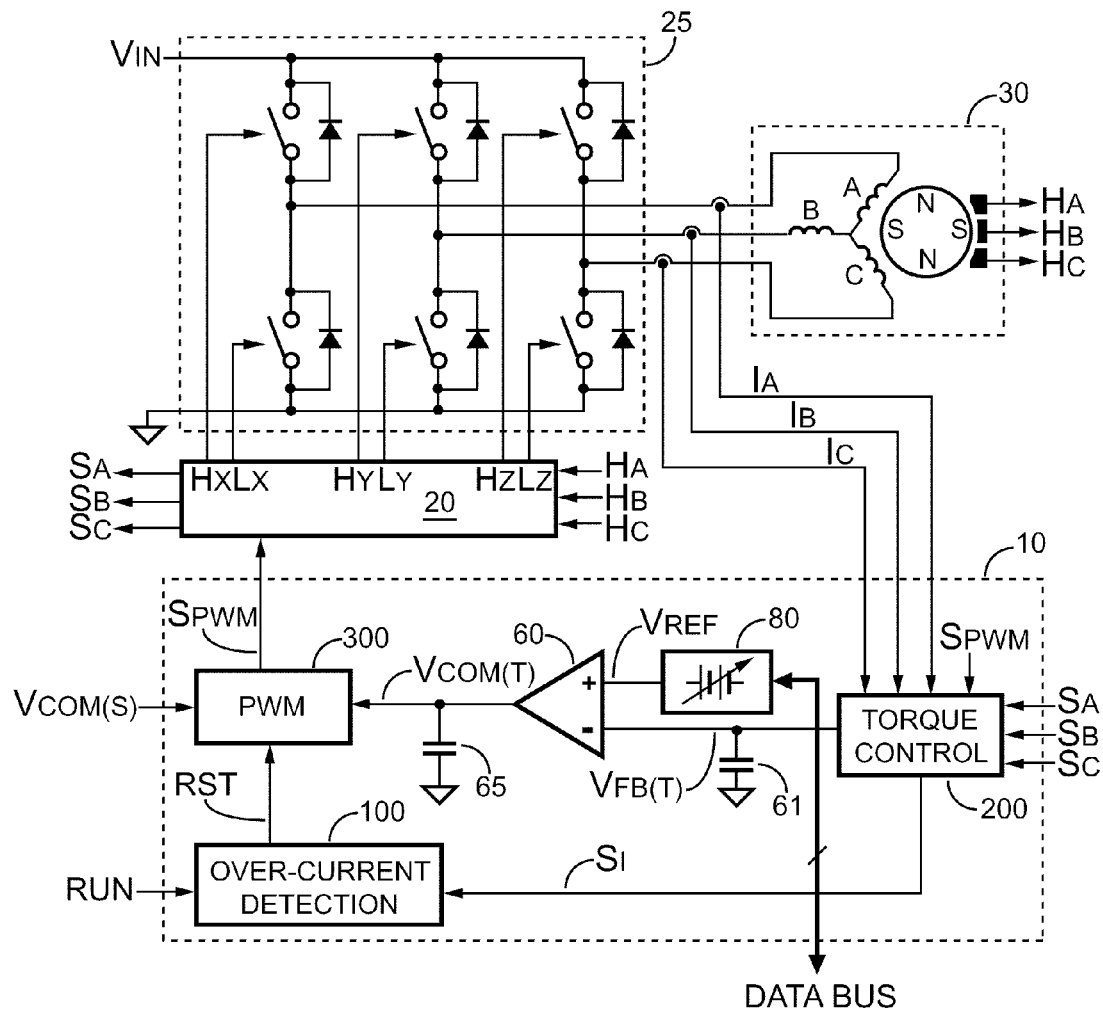
FIG. 1 schematically shows a BLDC (brushless direct current) motor system according to the present invention.

FIG. 1 schematically shows a BLDC (brushless direct current) motor system according to the present invention. The BLDC motor system comprises a control circuit 10, a sequencer 20, a driving circuit 25, and a BLDC motor 30. A plurality of switching-current signals $I_A$, $I_B$, and $I_C$ are respectively sensed from the driving circuit 25 in each phase and are correlated to a switching current of the BLDC motor 30. Speed-output signals $H_A$, $H_B$, and $H_C$ are generated by detecting the rotor position of the BLDC motor 30. The control circuit 10 receives the speed-output signals $H_A$, $H_B$, and $H_C$ and the switching-current signals $I_A$, $I_B$, and $I_C$ to generate a PWM signal $S_{PWM}$. The sequencer 20 receives the PWM signal $S_{PWM}$ to modulate the pulse width of switching signals $H_X$, $L_X$, $H_Y$, $L_Y$, $H_Z$, and $L_Z$ output by the sequencer 20 and generate sampling signals $S_A$, $S_B$, and $S_C$. Sampling signals $S_A$, $S_B$ and $S_C$ are correlated to the speed-output signals $H_A$, $H_B$, and $H_C$ of the BLDC motor 10. The switching signals $H_X$, $L_X$, $H_Y$, $L_Y$, $H_Z$, and $L_Z$ are further coupled to drive the BLDC motor 30 via the driving circuit 25. According to the arrangement of the known six-step commutation, the BLDC motor 30 can therefore run smoothly.

As shown in FIG. 1, the control circuit 10 comprises a torque-control circuit 200, a reference-signal generator 80, an error amplifier 60, a PWM circuit 300, an over-current detection circuit 100, a filter capacitor 61, and a compensation capacitor 65. The torque-control circuit 200 and the over-current detection circuit 100 control the maximum torque and the maximum switching current of the BLDC motor 30. The torque-control circuit 200 is coupled to the BLDC motor 30. The torque-control circuit 200 receives the switching-current signals $I_A$, $I_B$, $I_C$, the sampling signals $S_A$, $S_B$, $S_C$ and the PWM signal $S_{PWM}$ to generate a torque-feedback signal $V_{FB(T)}$ at a first output terminal and a current signal $S_I$ at a second output terminal. The reference-signal generator 80 generates a torque-reference signal $V_{REF}$ in response to data provided by an interface DATA BUS which can be a parallel data bus or a serial data bus. The error amplifier 60 amplifies an error between the torque-feedback signal $V_{FB(T)}$ and the torque-reference signal $V_{REF}$ to generate a torque-control signal $V_{COM(T)}$ at an output terminal of the error amplifier 60. The torque-control circuit 200, the reference-signal generator 80 and the error amplifier 60 form a torque-feedback loop. The filter capacitor 61 is coupled to the first output terminal of the torque-control circuit 200 to filter noise on the torque-feedback signal $V_{FB(T)}$. The compensation capacitor 65 is coupled to the output terminal of the error amplifier 60 to provide frequency compensation for the torque-feedback loop.

The over-current detection circuit 100 generates a reset signal RST in response to the current signal $S_I$ from the torque-control circuit 200. The PWM circuit 300 generates the PWM signal $S_{PWM}$ for driving the BLDC motor 30 via the sequencer 20 and the driving circuit 25 in response to the torque-control signal $V_{COM(T)}$, a speed-control signal $V_{COM(S)}$, and/or the reset signal RST. The speed-control signal $V_{COM(S)}$ is sourced, for example, from a speed-control circuit in response to a plurality of speed-output signals, such as $H_A$, $H_B$, and $H_C$ which are generated by hall sensors embedded to a stator of the BLDC motor 30. The switching signals $H_X$, $L_X$, $H_Y$, $L_Y$, $H_Z$, and $L_Z$ output by the sequencer 20 are coupled to drive the BLDC motor 30 via the driving circuit 25. The pulse width of the switching signals $H_X$, $L_X$, $H_Y$, $L_Y$, $H_Z$, and $L_Z$ is determined by the pulse width of the PWM signal $S_{PWM}$. The torque-feedback signal $V_{FB(T)}$, the torque-control signal $V_{COM(T)}$ and the speed-control signal $V_{COM(S)}$ are all analog signals. The pulse width of the PWM signal $S_{PWM}$ is correlated to the level of the speed-control signal $V_{COM(S)}$ and/or the level of the torque-control signal $V_{COM(T)}$. The pulse width of the PWM signal $S_{PWM}$ is also controlled by the reset signal RST generated by the over-current detection circuit 100.

Figure 2:
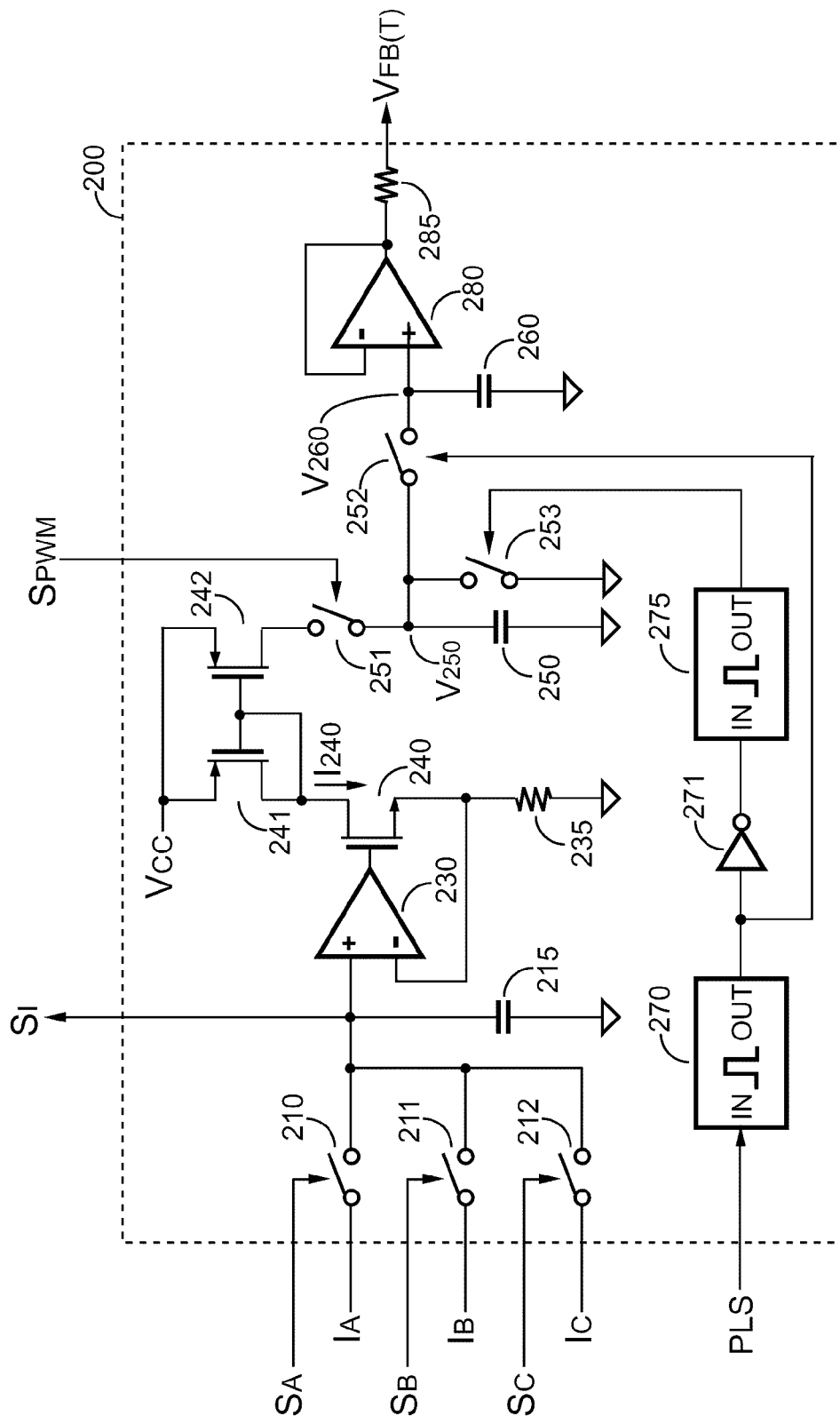
FIG. 2 shows an embodiment of a torque-control circuit according to the present invention.

FIG. 2 shows an embodiment of the torque-control circuit 200 according to the present invention. The torque-control circuit 200 comprises a current-sense circuit, an integration circuit, an operational amplifier 280, and a filter resistor 285. The current-sense circuit comprises a sampling circuit and a V-to-I converter. The sampling circuit comprises a first sampling switch 210, a second sampling switch 211, a third sampling switch 212, and a first hold capacitor 215. A first terminal of the first sampling switch 210 is supplied with the switching-current signal $I_A$. A first terminal of the second sampling switch 211 is supplied with the switching-current signal $I_B$. A first terminal of the third sampling switch 212 is supplied with the switching-current signal $I_C$. The first sampling switch 210, the second sampling switch 211 and the third sampling switch 212 are respectively controlled by the sampling signals $S_A$, $S_B$, and $S_C$. A second terminal of the first sampling switch 210, a second terminal of the second sampling switch 211, a second terminal of the third sampling switch 212, and a first terminal of the first hold capacitor 215 are connected to an input terminal of the V-to-I converter. A second terminal of the first hold capacitor 215 is connected to a ground reference.

The V-to-I converter comprises an error amplifier 230, a transistor 240, a resistor 235, and a current mirror. A positive terminal of the error amplifier 230 is also the input terminal of the V-to-I converter. A negative terminal of the error amplifier 230 is connected to a source of the transistor 240. The resistor 235 is connected between the source of the transistor 240 and the ground reference. An output terminal of the error amplifier 230 is connected to a gate of the transistor 240. A drain of the transistor 240 is connected to an input terminal of the current mirror. The current mirror is composed of transistors 241 and 242 which are both supplied with a supply voltage $V_{CC}$.

The integration circuit comprises a first switch 251, an integration capacitor 250, a second switch 252, a third switch 253, a second hold capacitor 260, and a trigger circuit. A first terminal of the first switch 251 is connected to an output terminal of the current mirror. The integration capacitor 250 is connected between a second terminal of the first switch 251 and the ground reference. The third switch 253 is connected in parallel with the integration capacitor 250. A first terminal of the second switch 252 is connected to the second terminal of the first switch 251. The trigger circuit comprises pulse generators 270 and 275 and an inverter 271. A pulse signal PLS is supplied to an input terminal of the pulse generator 270. The inverter 271 is connected between an output terminal of the pulse generator 270 and an input terminal of the pulse generator 275. The output terminal of the pulse generator 270 generates a hold signal to control the second switch 252. An output terminal of the pulse generator 275 generates a discharge signal to control the third switch 253. The second hold capacitor 260 is connected between a second terminal of the second switch 252 and the ground reference. The operational amplifier 280 serves as a buffer. A positive terminal of the operational amplifier 280 is connected to the second terminal of the second switch 252. A negative terminal of the operational amplifier 280 is connected to an output terminal of the operational amplifier 280. The output terminal of the operational amplifier 280 generates the torque-feedback signal $V_{FB(T)}$ via a filter formed by the filter resistor 285 and the filter capacitor 61.

The sampling circuit samples the switching-current signals $I_A$, $I_B$, and $I_C$ for generating the current signal $S_I$ across the first hold capacitor 215. The V-to-I converter converts the current signal $S_I$ into a current $I_{240}$ flowing through the transistor 240. The current $I_{240}$ is mirrored via the current mirror to charge the integration capacitor 250 when the PWM signal $S_{PWM}$ turns on the first switch 251. An integration voltage $V_{250}$ is therefore obtained across the integration capacitor 250. As the pulse signal PLS becomes logic-high, the output terminal of the pulse generator 270 will generate the hold signal to turn on the second switch 252. The integration voltage $V_{250}$ will be conducted via the second switch 252 to form a hold voltage $V_{260}$ across the second hold capacitor 260. The operational amplifier 280 amplifies the hold voltage $V_{260}$ to generate the torque-feedback signal $V_{FB(T)}$ via the filter formed by the filter resistor 285 and the filter capacitor 61. Therefore, the torque-feedback signal $V_{FB(T)}$ is correlated to the switching current of the BLDC motor 30.

Figure 3:
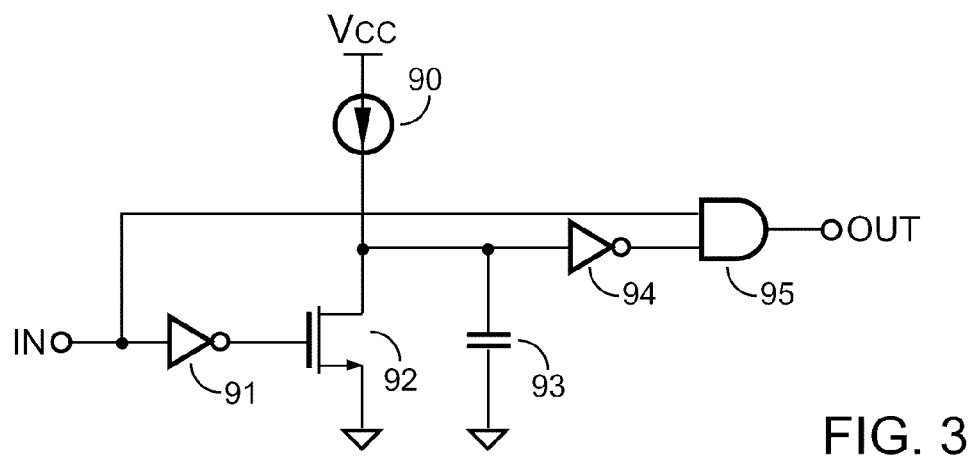
FIG. 3 shows an embodiment of a pulse generator according to the present invention.

FIG. 3 shows an embodiment of the pulse generator, such as 270 and 275 in FIG. 2, according to the present invention. The pulse generator comprises inverters 91 and 94, a current source 90, a transistor 92, a capacitor 93, and an AND gate 95. An input terminal IN of the pulse generator is coupled to a gate of the transistor 92 via the inverter 91. The input terminal IN of the pulse generator is also coupled to an input terminal of the AND gate 95. The current source 90 is coupled between the supply voltage $V_{CC}$ and a drain of the transistor 92. A source of the transistor 92 is connected to the ground reference. The capacitor 93 is connected between the drain of the transistor 92 and the ground reference. The inverter 94 is coupled between the drain of the transistor 92 and another input terminal of the AND gate 95. An output terminal of the AND gate 95 is coupled to an output terminal OUT of the pulse generator. As the input terminal IN of the pulse generator becomes logic-high, the output terminal OUT of the pulse generator will generate a short logic-high pulse whose width is determined by the current amplitude of the current source 90 and the capacitance of the capacitor 93.

Figure 4:
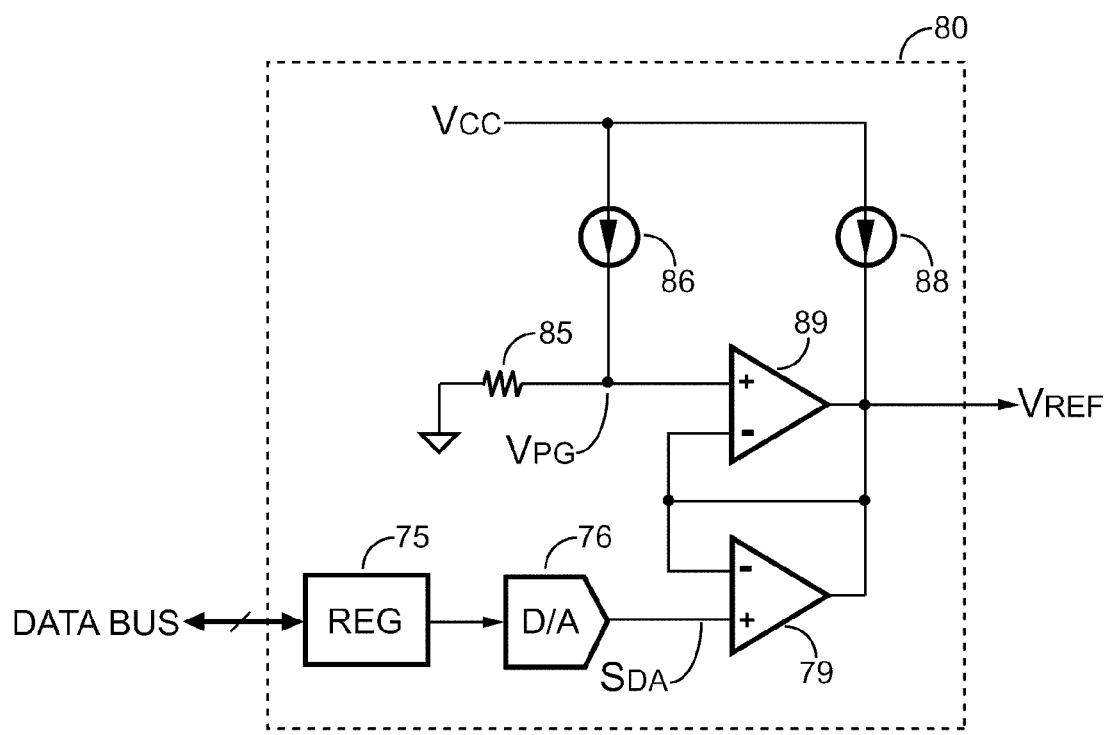
FIG. 4 shows an embodiment of a reference-signal generator according to the present invention.

FIG. 4 shows an embodiment of a reference-signal generator 80 according to the present invention. The reference-signal generator 80 comprises a register 75, a digital-to-analog converter 76, current sources 86 and 88, operational amplifiers 79 and 89, and a resistor 85. The current source 86 and the resistor 85 generate a programmable signal $V_{PG}$. The register 75 receives the data from the interface DATA BUS which is coupled to, for example, microprocessors. The digital-to-analog converter 76 generates an analog signal $S_{DA}$ in response to an output of the register 75. The programmable signal $V_{PG}$ is supplied to a positive terminal of the operational amplifier 89. The analog signal $S_{DA}$ is supplied to a positive terminal of the operational amplifier 79. A negative terminal of the operational amplifier 89 is connected to a negative terminal of the operational amplifier 79. Output terminals of the operational amplifiers 79 and 89 are open-drain type and are both connected to the negative terminals of operational amplifiers 79 and 89. The current sources 86 and 88 are both supplied with the supply voltage $V_{CC}$. The current source 88 is coupled to the output terminals of operational amplifiers 79 and 89 to pull high the reference signal $V_{REF}$ generated at the output terminals of operational amplifiers 79 and 89. The reference signal $V_{REF}$ varies in response to the amplitude of the analog signal $S_{DA}$ when the amplitude of the analog signal $S_{DA}$ is lower than that of the programmable signal $V_{PG}$. Once the amplitude of the analog signal $S_{DA}$ exceeds that of the programmable signal $V_{PG}$, the reference signal $V_{REF}$ will be equal to the amplitude of the programmable signal $V_{PG}$. Therefore, the programmable signal $V_{PG}$ determines a maximum magnitude of the analog signal $S_{DA}$, so that the reference-signal generator 80 can generates the torque-reference signal $V_{REF}$ in response to the data provided by the interface DATA BUS.

Figure 5:
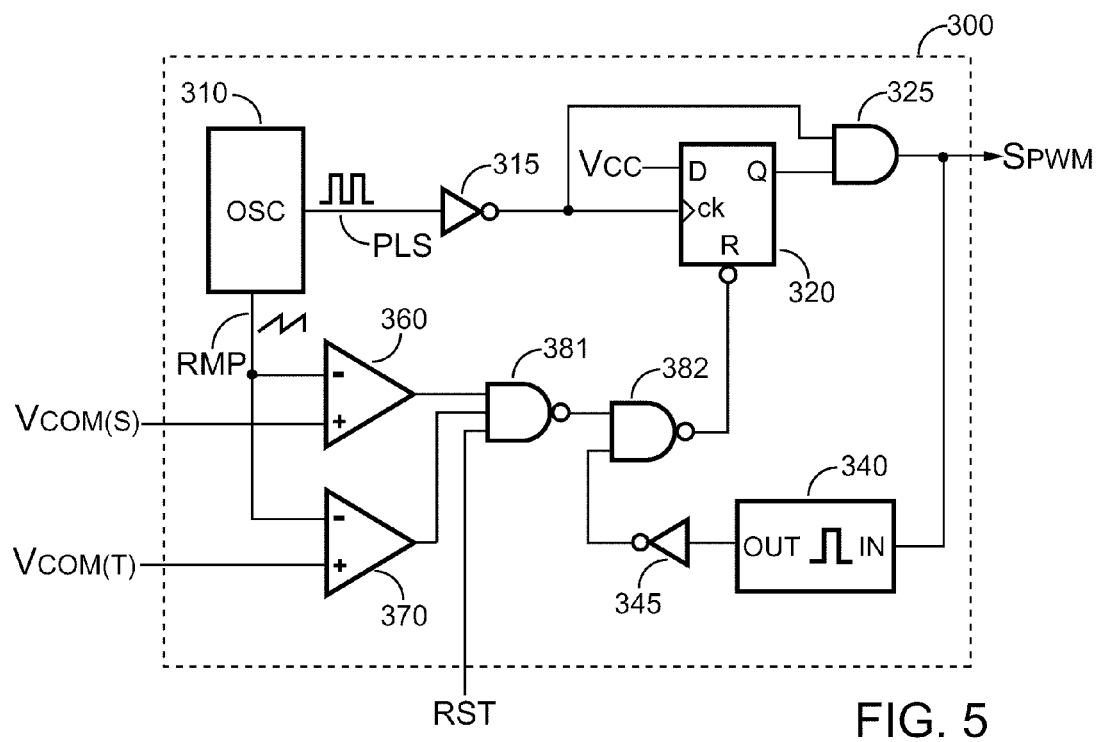
FIG. 5 shows an embodiment of a PWM circuit according to the present invention.

FIG. 5 shows an embodiment of the PWM circuit 300 according to the present invention. The PWM circuit 300 comprises an oscillator 310, comparators 360 and 370, inverters 315 and 345, NAND gate 381 and 382, a flip-flop 320, an AND gate 325, and a pulse generator 340. The oscillator 310 generates the pulse signal PLS and a ramp signal RMP. The pulse signal PLS enables the flip-flop 320 via the inverter 315. A first input terminal of the AND gate 325 is connected to an output terminal of the inverter 315. A second input terminal of the AND gate 325 is coupled to an output terminal of the flip-flop 320. An output terminal of the AND gate 325 generates the PWM signal $S_{PWM}$. The ramp signal RMP is supplied to negative terminals of the comparators 360 and 370. The speed-control signal $V_{COM(S)}$ is supplied to a positive terminal of the comparator 360 to be compared with the ramp signal RMP. The torque-control signal $V_{COM(T)}$ is supplied to a positive terminal of the comparator 370 to be compared with the ramp signal RMP as well. Three input terminals of the NAND gate 381 are respectively connected to an output terminal of the comparator 360, an output terminal of the comparator 370, and the reset signal RST which is generated by the over-current detection circuit 100. The comparators 360 and 370 are coupled to disable the PWM signal $S_{PWM}$ via the NAND gates 381 and 382. An input terminal of the pulse generator 340 is supplied with the PWM signal $S_{PWM}$. An output terminal of the pulse generator 340 is coupled to disable the PWM signal $S_{PWM}$ via the inverter 345 and the NAND gate 382. The pulse generator 340 and the inverter 345 produce a blanking time to disable the PWM signal $S_{PWM}$. The blanking time provides a minimum on-time for the PWM signal $S_{PWM}$ once the PWM signal $S_{PWM}$ is enabled. As FIG. 5 shows, the lower signal among the speed-control signal $V_{COM(S)}$ and the torque-control signal $V_{COM(T)}$ determines the pulse width of the PWM signal $S_{PWM}$.

Figure 6:
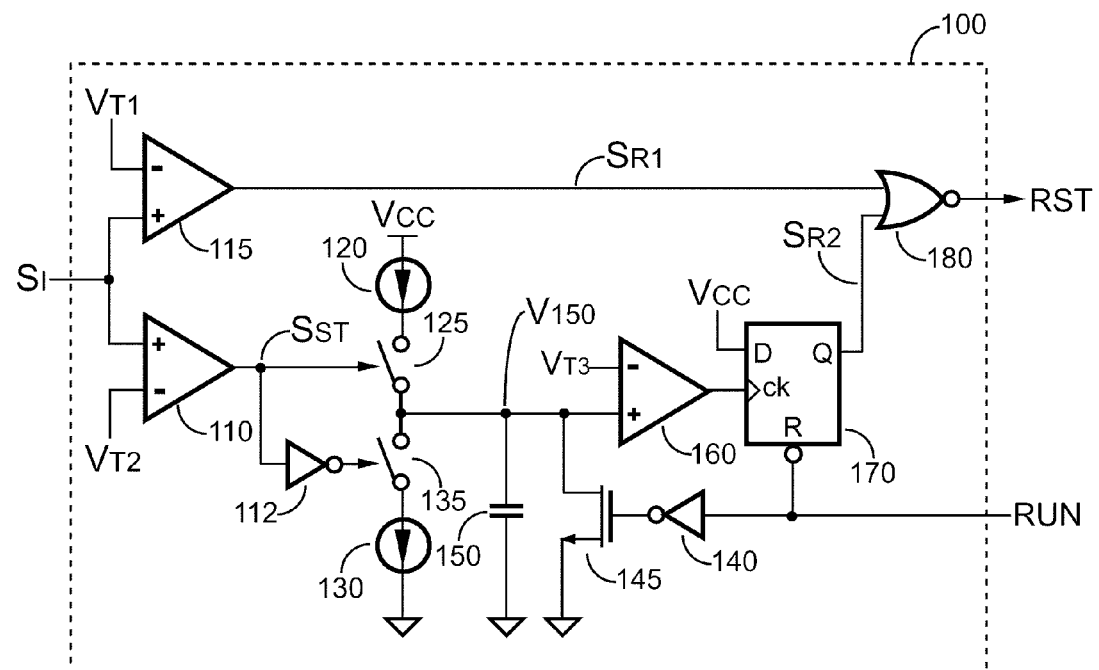
FIG. 6 shows an embodiment of an over-current detection circuit according to the present invention.

FIG. 6 shows an embodiment of the over-current detection circuit 100 according to the present invention. The over-current detection circuit 100 comprises a first comparison circuit 115, a second comparison circuit 110, a timer, and a NOR gate 180. The first comparison circuit 115 compares the current signal $S_I$ and a first threshold $V_{T1}$. A first reset signal $S_{R1}$ is generated once the current signal $S_I$ exceeds the first threshold $V_{T1}$. The second comparison circuit 110 compares the current signal $S_I$ and a second threshold $V_{T2}$. A second reset signal $S_{R2}$ is generated to latch off the PWM signal $S_{PWM}$ once the current signal $S_I$ exceeds the second threshold $V_{T2}$ for longer than a delay time of the timer. The first threshold $V_{T1}$ is greater than the second threshold $V_{T2}$. Once the current signal $S_I$ exceeds the second threshold $V_{T2}$, the second comparison circuit 110 will generate a timer-start signal $S_{ST}$. The timer comprises current sources 120, 130, switches 125, 135, inverters 112, 140, a capacitor 150, a transistor 145, a comparator 160 and a flip-flop 170. The current source 120, the switch 125, the switch 135, and the current source 130 are connected in series between the supply voltage $V_{CC}$ and the ground reference. The switch 125 is controlled by the timer-start signal $S_{ST}$. The switch 135 is controlled by the timer-start $S_{ST}$ via the inverter 112. A positive terminal of the comparator 160 is connected to a joint of the switches 125 and 135. A negative terminal of the comparator 160 is supplied with a third threshold $V_{T3}$. An output terminal of the comparator 160 is coupled to enable the flip-flop 170. The capacitor 150 is connected between the positive terminal of the comparator 160 and the ground reference. The transistor 145 is connected in parallel with the capacitor 150. A gate of the transistor 145 receives a remote-control signal RUN via the inverter 140. An output terminal of the flip-flop 170 generates the second reset signal $S_{R2}$. A reset input terminal of the flip-flop 170 is supplied with the remote-control signal RUN. The NOR gate 180 receives the first reset signal $S_{R1}$ and the second reset signal $S_{R2}$ to generate the reset signal RST. Therefore, the reset signal RST is generated in response to the first reset signal $S_{R1}$ and the second reset signal $S_{R2}$.

The current source 120 will start to charge the capacitor 150 when the timer-start signal $S_{ST}$ is enabled. Once a voltage $V_{150}$ across the capacitor 150 is higher than the third threshold $V_{T3}$, the comparator 160 will enable the flip-flop 170 for generating the second reset signal $S_{R2}$. The timer is enabled once the timer-start signal $S_{ST}$ is enabled. The current of the current source 120 and the capacitance of the capacitor 150 determine the delay time of the timer. The second reset signal $S_{R2}$ is generated once the delay time ends. The second reset signal $S_{R2}$ is generated and latched by the flip-flop 170. Thus, the PWM signal $S_{PWM}$ is latched off once the second reset signal $S_{R2}$ is generated. The first reset signal $S_{R1}$ is coupled to disable the PWM signal $S_{PWM}$ cycle-by-cycle. The remote-control signal RUN is connected to the reset input terminal of the flip-flop 170. The remote-control signal RUN is utilized to enable/disable the PWM signal $S_{PWM}$ for switching on/off the BLDC motor 30. Once the second reset signal $S_{R2}$ is generated by the flip-flop 170, the latch state of the second reset signal $S_{R2}$ can be released by disabling the remote-control signal RUN.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control circuit for a BLDC motor, comprising:
   a torque-control circuit, coupled to said BLDC motor for generating a torque-feedback signal in response to a switching current of said BLDC motor;
   a reference-signal generator, generating a torque-reference signal;
   an amplifying circuit, coupled to receive said torque-feedback signal and said torque-reference signal for generating a torque-control signal; wherein said torque-control circuit, said reference-signal generator and said amplifying circuit form a torque-feedback loop;
   an over-current detection circuit, coupled to generate a reset signal in response to said switching current of said BLDC motor; and
   a PWM circuit, generating a PWM signal to drive said BLDC motor in response to said torque-control signal, a speed-control signal and/or said reset signal; wherein said reset signal is generated when said switching current of said BLDC motor exceeds a threshold; a pulse width of said PWM signal is determined in response to said torque-control signal, said speed-control signal, and/or said reset signal.

2. The control circuit as claimed in claim 1, wherein said speed-control signal is sourced from a speed-control circuit in response to a plurality of speed-output signals which are generated by hall sensors embedded to a stator of said BLDC motor.

3. The control circuit as claimed in claim 1 further comprising:
   a compensation capacitor, coupled to an output terminal of said amplifying circuit to provide frequency compensation for said torque-feedback loop; and
   a filter capacitor, coupled to an output terminal of said torque-control circuit for filtering noise of said torque-feedback signal.

4. The control circuit as claimed in claim 1, wherein said reference-signal generator comprises:
   a current source and a resistor, to generate a programmable signal; and
   a digital-to-analog converter, to generate an analog signal; wherein said torque-reference signal is generated in response to said programmable signal and said analog signal.

5. The control circuit as claimed in claim 1, wherein said torque-control circuit comprises:
   a sampling circuit, coupled to sample said switching current of said BLDC motor for generating a current signal; and
   an integration circuit, generating said torque-feedback signal by integrating said current signal; wherein said torque-feedback signal is correlated to said switching current of said BLDC motor.

6. The control circuit as claimed in claim 5, wherein said over-current detection circuit comprises:
   a first comparison circuit, generating a first reset signal when said current signal exceeds a first threshold;
   a second comparison circuit, generating a timer-start signal when said current signal exceeds a second threshold; and
   a timer, generating a second reset signal in response to said timer-start signal;
   wherein said reset signal is generated in response to said first reset signal and said second reset signal, said timer is enabled once said timer-start signal is enabled, and said second reset signal is generated once a delay time of said timer ends.

7. The control circuit as claimed in claim 6, wherein said PWM signal is latched off once said second reset signal is generated.

8. The control circuit as claimed in claim 6, wherein said first reset signal is coupled to disable said PWM signal cycle-by-cycle.

9. A control circuit for a BLDC motor comprising:
- a current-sense circuit, coupled to said BLDC motor for generating a current signal in response to a switching current of said BLDC motor;
- an over-current detection circuit, coupled to generate a first reset signal and a second reset signal in response to said current signal; and
- a PWM circuit, generating a PWM signal to drive said BLDC motor;
- wherein said first reset signal is generated to disable said PWM signal cycle-by-cycle when said current signal exceeds a first threshold; and
- wherein said second reset signal is generated to latch off said PWM signal when said current signal exceeds a second threshold for longer than a delay time.

10. The control circuit as claimed in claim 9, wherein said current-sense circuit comprises:
- a sampling circuit, coupled to sample said switching current of said BLDC motor for generating said current signal, wherein said current signal is correlated to said switching current of said BLDC motor.

11. The control circuit as claimed in claim 9, wherein said over-current detection circuit comprises:
- a first comparison circuit, generating said first reset signal when said current signal exceeds said first threshold;
- a second comparison circuit, generating a timer-start signal when said current signal exceeds said second threshold; and
- a timer, generating said second reset signal in response to said timer-start signal;
- wherein said timer is enabled once said timer-start signal is enabled, and said second reset signal is generated once said delay time ends.

12. The control circuit as claimed in claim 9, wherein said over-current detection circuit receives a remote-control signal coupled to enable/disable said PWM signal for switching on/off said BLDC motor.

13. The control circuit as claimed in claim 12, wherein a latch state of said second reset signal is released once said remote-control signal is disabled.

\* \* \* \* \*